United States Patent Office 2,879,281
Patented Mar. 24, 1959

2,879,281

TRANS ESTERIFICATION OF TRIGLYCERIDES BY MEANS OF PLURAL METAL CATALYST

George Y. Brokaw, Rochester, N.Y., assignor to Eastman Kodak Company, Rochester, N.Y., a corporation of New Jersey No Drawing. Application June 29, 1955
Serial No. 518,951

4 Claims. (Cl. 260—410.7)

This invention relates to a process for preparing mixed triglyceride compositions, and is particularly concerned with a cyclic process for preparing triglycerides containing both lower and higher acyl radicals.

The present mixed triglycerides are "tailor-made" fatty materials which have many useful properties not found in naturally occurring fatty materials. Mixed triglycerides have many applications, both for food and non-food uses. Specifically, mixed triglycerides can be used as coatings for such foods as hams, wieners, raisins, nuts and the like to reduce dehydration and rancidity; and as plasticizers in such foods as margarine-like spreads and shortenings, in such cosmetics as hand creams and hair dressings, and plastics such as polyvinyls, polyvinilidenes, cellulose esters and the like. Likewise, mixed triglycerides have utility as lubricants and release agents. Other uses include coatings for medicinal-containing pills and tablets, components in suppositories, components in emulsions for intravenous injections, special dietary fats, and for a diversity of other uses. It is accordingly desirable to have a simple process adaptable to the commercial preparation of such "tailor-made" materials.

It is an object of this invention to provide a new and improved method for preparing mixed triglycerides.

It is another object of this invention to provide a novel cyclic process suitable for preparing "tailor-made" fatty compositions containing substantial amounts of mixed fatty triglycerides.

It is another object of this invention to prepare mixed fatty triglycerides by a new and improved cyclic process without objectionable decomposition or discoloration of the reactants or products during said process.

Another object of this invention is to prepare mixed triglycerides containing fat-forming fatty acid radicals and butyryl radicals by novel means.

Another object of this invention is to provide a novel process for preparing mixed triglycerides containing at least one acetyl radical and at least one fat-forming fatty acid radical.

Another object of this invention is to prepare by novel means a composition comprised essentially of a triglyceride containing two acetyl radicals and one fat-forming fatty acid radical.

Another object of this invention is to prepare mixed triglycerides by a novel continuous process.

It is a further object of this invention to provide a new and improved cyclic process for preparing mixed fatty triglycerides in which the catalyst employed is retained in active form throughout the process.

It is an additional object of this invention to provide a novel process for preparing mixed triglycerides containing at least one lower acyl radical having two to six carbon atoms and at least one higher acyl radical having at least eight carbon atoms.

These and other objects are accomplished by reacting a fatty triglyceride having lower acyl radicals and a triglyceride having higher acyl radicals in the presence of a suitable high temperature ester-ester interchange catalyst. The resulting mixture is thereafter subjected to vacuum distillation effective to distill therefrom a distillate containing unreacted portions of the lower acyl triglyceride reactant. The residue from the first distillation is subjected to thin film vacuum distillation effective to distill a substantial amount of a mixed triglyceride containing lower and higher acyl radicals. The distillate resulting from the first distillation and the residue resulting from the second distillation are combined with additional amounts of lower acylated triglyceride and higher acylated triglyceride make-up material and the above sequential steps repeated.

The term "mixed triglycerides" used herein refers to substantially fully esterified glycerides containing at least one lower acryl radical and at least one higher acyl radical.

Lower acylated triglycerides suitable in the present process include any triglyceride containing acyl radicals having from two to six carbon atoms. Suitable lower acylated triglycerides include triacetin, tripropionin, tributyrin, triisobutyrin, trivalerin and tricaproin, with triacetin and tributyrin being preferably employed.

Any higher acylated triglyceride containing acyl radicals having at least eight carbon atoms, suitably from eight to twenty-four carbon atoms, and desirably from twelve to twenty carbon atoms, can be employed, the straight chain fatty acid radicals being more generally utilized. Higher fatty triglycerides containing fat-forming fatty acids, such as the triglycerides derived from animal fats and vegetable oils, are preferably employed. The higher acylated triglycerides can be either hydrogenated or unhydrogenated, the degree of hydrogenation being an important variant in determining the physical properties of the mixed triglyceride product. Examples of suitable higher acylated triglycerides include trilaurin, tripalmitin, tristearin, and the like; and such naturally occurring triglycerides as are found in lard, beef tallow, cottonseed oil, soybean oil, peanut oil, coconut oil, and in other fatty materials. The term "fat-forming fatty acid radical" used herein refers to higher acyl radicals derived from naturally occurring fats and oils, whether hydrogenated or unhydrogenated.

The present invention is a cyclic process which is especially suited for the commercial production of the present mixed triglycerides, and is of particular utility when employed as a continuous process. Many catalysts are destroyed at the reaction and distillation temperatures employed in such cyclic and continuous processes, and thus are not suitable for the present invention. Further, the present process comprises an ester-ester interchange type of reaction between fully esterified glycerides. The usual catalysts, such as strong acids, strong alkalis, alcoholates, and other catalysts effective for the alcoholysis type of reaction are not effective in the present ester-ester interchange type of reaction. In the present process, high temperature ester-ester interchange catalysts are employed. Eminently suited are the plural metal soap catalysts described in the present inventor's copending application, U. S. Serial No. 388,065 filed October 23, 1953, now abandoned.

Plural metal soap catalysts suitable for the present process are soaps containing at least two metals wherein one of the metals is an alkali or an alkaline earth metal and the other metal is an amphoteric metal. Suitable alkali or alkaline earth metals include sodium, potassium, lithium, cesium, calcium, strontium, and barium, although any of the alkali or alkaline earth metals can be used. Typical amphoteric metals include aluminum, titanium, zirconium, cerium, tin, lead, cobalt, molybdenum, manganese, cadmium, iron, copper, chromium, vanadium, thallium, nickel, platinum, palladium and zinc, although any of the amphoteric metals characterized by the ability to act as cations or to form a metal-bearing anion can be employed. Such plural metal catalysts can be added as soaps to the reaction mixture, or, well-known metal compounds containing the metal moiety such as oxides, alcoholates, chlorides and hydroxides can be added to the reaction mixture to form the plural metal soap in situ. When the soap is formed in situ, it will be a mixture of soaps depending upon the fatty acids present in the reaction mixture. Typical examples of suitable plural metal soap catalysts include lithium aluminum stearate, lithium aluminum palmitate, sodium aluminum oleate, sodium titanium stearate, lithium titanium palmitate, calcium aluminum stearate, strontium titanium palmitate and the like. However, any other high temperature ester-ester interchange catalyst capable of being recycled in the present process without substantial destruction can be employed.

The present process is best illustrated with reference to an embodiment thereof: for example, the interesterification of lard and triacetin in the presence of a plural metal soap catalyst to prepare a fatty composition containing substantial amounts of a mixed fatty triglyceride having the structure:

wherein R represents the fat-forming fatty acid radicals found in lard, and R' represents an acetyl radical. Such materials are often called "diacetylated monoglycerides."

The triacetin and lard are combined in a suitable reactor at a ratio of about two parts of triacetin to one part of lard on a molar basis, although ratios from about ¼ to about 9/1 are entirely suitable. Molar ratios of lower acylated triglyceride to higher acylated triglyceride in the reaction mixture ranging from about 1/1 to about 9/1 on a molar basis are preferably employed in the present process for preparing maximum amounts of the di-lower acylated product, and ratios from about 1/4 to about 2/1 are preferably employed for preparing maximum amounts of the mono-lower acylated product. A high temperature ester-ester interchange catalyst is utilized. Concentrations of catalyst of the order of about 0.1% to 0.5% are more generally employed, although amounts as low as 0.05% and as high as 1%, or even 5%, can be used. A typical catalyst is 0.2% lithium aluminum stearate.

Lithium aluminum stearate and other related plural metal soap catalysts are high temperature catalysts, that is, they are particularly effective at temperatures higher than about 180° C. Such catalysts are more generally employed at temperatures over 200° C. and preferably in the range of 230° C. to 260° C., although higher temperatures can be employed. A suitable temperature to effect the reaction between triacetin and lard in the presence of a lithium aluminum stearate catalyst is about 250° C.

The reactants are held in the reactor until a substantial amount of ester-ester interchange has taken place. A typical reaction period for the present lard and triacetin reactants, in the presence of a lithium aluminum soap catalyst at a temperature of about 250° C., is about one hour, although substantially shorter or longer reaction periods can be suitably employed. The present process can be arranged so that additional amounts of make-up materials and recycle materials are continuously entering one portion of the reaction zone while reacted material is continuously withdrawn from another portion of the reaction zone. In such an arrangement, the reaction period is merely the average time that given portions of the reactants remain in the reaction zone. In a continuous process, the added make-up material comprised of higher acylated triglyceride and lower acylated triglyceride is substantially equal in weight to the amount of mixed triglyceride product separated by distillation and, the compounds comprising the added make-up material contain substantially equal molar proportions of higher acyl radicals and lower acyl radicals as the compounds comprising the distilled mixed triglyceride product. The plural metal soap catalyst is not substantially destroyed under the conditions of reaction and can be recycled several times.

The product resulting from such an ester-ester interchange reaction is comprised of unreacted lower fatty triglyceride (e. g. triacetin), unreacted higher fatty triglyceride (e. g. lard), a triglyceride containing two lower fatty acid radicals and one higher fatty acid radical, and a triglyceride containing one lower fatty acid radical and two higher fatty acid radicals.

The reaction products are thereafter subjected to vacuum distillation. Suitable distillation apparatus includes thin film high vacuum molecular stills of the centrifugal type, or of the falling film type, or other related thin film vacuum distillation apparatus. This first distillation is effected under conditions effective to distill from the reaction mixture substantially all of the unreacted triacetin, thin film vacuum distillation being preferably employed, although any vacuum distillation suitable for removing substantially all of the unreacted triacetin without objectionable decomposition or discoloration of the reactants or the reaction products can be employed. If the present diacetylated product is to be used as an edible material, it is ordinarily the practice to have less than about 1% or 2% triacetin therein because of the extremely bitter taste of triacetin. Typical thin film vacuum distillation conditions suitable for removing unreacted triacetin are distillation temperatures up to about 135° C. and pressures of about 15 microns of mercury although considerable variation is possible in accordance with well-known distillation practice. The catalyst is not inactivated prior to the distillations in the present process, thus, the present distillations are made from active catalyst. The separated triacetin distillate is recycled to the reactor.

The residue from the above described distillation is subjected to thin film distillation effective to distill the desired acetylated product. Although considerable variation is possible in accordance with well-known distillation practice, distillation temperatures up to about 185° C. at a pressure of about 15 microns of mercury are suitable conditions to distill the present diacetylated reaction product; the monoacetylated reaction product, the lard triglyceride, and the catalyst remaining in the residue. The residue of the second distillation, like the distillate of the first distillation, is recycled to the reactor to complete a cycle of the process.

Yields of about 35% to 45% diacetylated product are not uncommon for a single cycle of the above described process, although complete conversion of the reactants to the diacetylated product can be approached by recycling the distillate of the first distillation and the residue of the second distillation as described above. In a continuous type of process, the recycle materials and make-up materials comprised of lard and triacetin are continuously fed into the reaction zone. Likewise, the successive distillations are effected continuously in a continuous process. As the plural metal soap catalyst is not destroyed during the reaction and by the successive distillations, additional amounts of catalyst need not be added to the system. Thus, a continuous type of reaction is practicable as there is not a build-up of inactivated catalyst materials in the system. Likewise, the plural metal soap catalysts do not cause gelling during distillation or objectionable decomposition or discoloration of the reactants or the product.

As noted hereinabove, the present mixed triglycerides have many physical properties not found in higher acylated triglycerides such as lard and the like. The degree of modification of the properties of such higher acylated triglycerides depends on the nature of the lower acylated triglyceride with which it is interesterified, and upon the degree of interesterification of these two reactants. For example, the properties of the monoacetylated product derived from lard vary substantially from the properties of the monobutyrated product derived from lard. Likewise, the properties of the monoacetylated product vary substantially from the diacetylated product. The melting point of typical lower acylated products derived from fully hydrogenated lard (commonly denominated "stearins") are shown in the following table.

Table

| Mixed triglyceride: | Melting point, ° C. |
|---|---|
| "Tristearin" | 61–62 |
| Monoaceto "distearin" | 30–31 |
| Diaceto "monostearin" | 26–29 |
| Monobutyro "distearin" | 31.5–32.5 |
| Dibutyro "monostearin" | About 15 |
| Diisobutyro "monostearin" | About 10 |

Both the mono- and the di-lower acylated materials can be prepared by the present process, although the present process is particularly adapted for the preparation of the di-lower acylated materials. For example, a mono- and a di-butyrated product can be prepared by reacting tributyrin and lard in the presence of a plural metal catalyst in the manner described above, stripping off unreacted tributyrin by thin film vacuum distillation at temperatures up to about 130° C. and at a pressure of about 15 microns of mercury, subjecting the residue of the first distillation to further thin film vacuum distillation at temperatures up to about 185° C. and a pressure of about 15 microns of mercury to distill off a dibutyrated product, and thereafter, subjecting the residue of the second distillation to additional thin film vacuum distillation at temperatures up to about 230° C. and at a pressure of about 15 microns of mercury to distill off a monobutyrated product. As before, the conditions set out are subject to considerable variation. Thus, by arranging a reactor in series with two or three thin film vacuum stills, by recycling the distillate from the first distillation and the residue from the third distillation, and by adding additional amounts of lard and tributyrin make-up materials, a cyclic process for preparing both a mono- and di- butyrated mixed triglyceride can be effected. Likewise, a mixture comprised of both mono- and di-butyrated mixed triglyceride compositions can be prepared by co-distilling these two materials under suitable distillation conditions. Similarly, other mono- and di-lower acylated triglycerides containing at least one higher acyl radical can be prepared.

Although the invention has been described in considerable detail with reference to certain preferred embodiments thereof, it will be understood that variations and modifications can be effected within the spirit and scope of the invention as described hereinabove and as defined in the appended claims.

This application is a continuation-in-part of my copending application, U. S. Serial No. 388,065, filed October 23, 1953, now abandoned.

I claim:

1. The process for preparing mixed triglyceride compositions which comprises continuously reacting in a reaction zone a higher acylated triglyceride containing higher acyl radicals having eight to twenty-four carbon atoms and a lower acylated triglyceride containing lower acyl radicals having two to four carbon atoms at a molar ratio of said lower acylated triglyceride to said higher acylated triglyceride ranging from about 1/4 to about 9/1, said reacting being effected at a temperature higher than 180° C. and up to 260° C. in the presence of a plural metal soap catalyst comprising at least two metals in soap form wherein one of said metals is selected from the group consisting of alkali and alkaline earth metals and one of said metals is an amphoteric metal, continuously withdrawing reaction mixture from said reaction zone, continuously subjecting said withdrawn reaction mixture to thin film vacuum distillation effective to separate therefrom substantially all of the remaining portions of said lower acylated triglyceride, continuously recycling the said separated lower acylated triglyceride into said reaction zone, continuously subjecting the resulting distillation residue to thin film vacuum distillation effective to separate therefrom a composition containing a substantial amount of a mixed triglyceride containing at least one of said higher acyl radicals and at least one of said lower acyl radicals, continuously recycling the resulting distillation residue into said reaction zone, and continuously introducing into said reaction zone make-up materials of said higher acylated triglyceride and said lower acylated triglyceride in amounts substantially equal by weight to the amount of mixed triglyceride compositions separated by the second said distillation, the said higher acylated triglyceride and said lower acylated triglyceride make-up material containing substantially equal molar proportions of said higher acyl radicals and said lower acyl radicals as the compounds comprising the mixed triglyceride composition separated by the second said distillation, said catalyst remaining substantially undestroyed throughout said reacting and distillation steps.

2. The process for preparing mixed triglyceride compositions which comprises continuously reacting in a reaction zone a higher acylated triglyceride containing fat-forming fatty acid radicals having from eight to twenty-four carbon atoms and triacetin at a molar ratio of triacetin to said higher acylated triglyceride ranging from about 1/4 to about 9/1, said reacting being effected at a temperature higher than 180° C. and up to 260° C. in the presence of a plural soap catalyst comprising at least two metals in soap form wherein one of said metals is selected from the group consisting of alkali and alkaline earth metals and one of said metals is an amphotheric metal, continuously withdrawing reaction mixture from said reaction zone, continuously subjecting said withdrawn reaction mixture to thin film vacuum distillation effective to separate therefrom substantially all of the unreacted portions of triacetin, continuously recycling the said separated triacetin into said reaction zone, continuously subjecting the resulting distillation residue to thin film vacuum distillation effective to separate therefrom a composition containing a substantial amount of a mixed triglyceride containing at least one of said fat-forming fatty acid radicals and at least one acetyl radical, continuously recycling the resulting distillation residue into said reaction zone, and continuously introducing into said reaction zone make-up materials of said higher acylated triglyceride and triacetin in amounts substantially equal by weight to the amount of mixed triglyceride composition separated by the second said distillation, the said higher acylated triglyceride and triacetin make-up material containing substantially equal molar proportions of said fat-forming fatty acid radicals and acetyl radicals as the compounds of the mixed triglyceride composition separated by the second said distillation, said catalyst remaining substantially undestroyed throughout said reacting and distillation steps.

3. The process for preparing mixed triglyceride compositions which comprises continuously reacting in a reaction zone lard and triacetin at a molar ratio of triacetin to lard ranging from about 1/1 to about 9/1 in the presence of a lithium aluminum soap catalyst at a temperature of about 230°–260° C., continuously withdrawing reaction mixture from said reaction zone, continuously subjecting said withdrawn reaction mixture to thin film vacuum distillation effective to separate therefrom substantially all of the unreacted triacetin, continuously recycling the said separated triacetin into said reaction zone, continuously subjecting the resulting distillation residue to thin film vacuum distillation effective to separate therefrom a composition comprised essentially of a mixed triglyceride containing two acetyl radicals and a fatty acid radical derived from said lard reactant, continuously recycling the resulting distillation residue into said reaction zone and continuously introducing into said reaction zone make-up materials of lard and triacetin in amounts substantially equal by weight to the amount of mixed triglyceride composition separated by the second said distillation, the lard and triacetin make-up material containing substantially equal molar proportions of fatty acid radicals derived from said lard reactant and acetyl radicals as the compounds of the mixed triglyceride composition separated by the second said distillation, said catalyst remaining substantially undestroyed throughout said reacting and distillation steps.

4. The process for preparing mixed triglyceride compositions which comprises reacting in a reaction zone a higher acylated triglyceride containing higher acyl radicals having eight to twenty-four carbon atoms and a lower acylated triglyceride containing lower acyl radicals having two to four carbon atoms at a molar ratio of said lower acylated triglyceride to said higher acylated triglyceride ranging from about ¼ to about 9/1, said reacting being effected at a temperature higher than 180° C. and up to 260° C. in the presence of a plural metal soap catalyst comprising at least two metals in soap form wherein one of said metals is selected from the group consisting of alkali and alkaline earth metals and one of said metals is an amphoteric metal, withdrawing reaction mixture from said reaction zone, subjecting said withdrawn reaction mixture to thin film vacuum distillation effective to separate therefrom substantially all of the remaining portions of said lower acylated triglyceride, recycling the said separated lower acylated triglyceride into said reaction zone, subjecting the resulting distillation residue to thin film vacuum distillation effective to separate therefrom a composition containing a substantial amount of a mixed triglyceride containing at least one of said higher acyl radicals and at least one of said lower acyl radicals, recycling the resulting distillation residue into said reaction zone, and introducing into said reaction zone make-up materials of said higher acylated triglyceride and said lower acylated triglyceride in amounts substantially equal by weight to the amount of mixed triglyceride compositions separated by the second said distillation, the said higher acylated triglyceride and said lower acylated triglyceride make-up material containing substantially equal molar proportions of said higher acyl radicals and said lower acyl radicals as the compounds comprising the mixed triglyceride composition separated by the second said distillation, said catalyst remaining substantially undestroyed throughout said reacting and distillation steps.

References Cited in the file of this patent

UNITED STATES PATENTS

| | | |
|---|---|---|
| 1,873,513 | Van Loon | Aug. 23, 1932 |
| 2,309,949 | Gooding | Feb. 2, 1943 |
| 2,614,937 | Baur | Oct. 21, 1952 |
| 2,615,160 | Baur | Oct. 21, 1952 |
| 2,628,967 | Voegeli | Feb. 17, 1953 |
| 2,634,278 | Kuhrt | Apr. 7, 1953 |

OTHER REFERENCES

Dean: Utilization of Fats, 1938, pp. 118–119.
Markley: Fatty Acids, 1947, pp. 307–309.
Markley: Fatty Acids, 1947, pp. 594–5.
Ralson: Fatty Acids and Their Derivatives, 1948, pp. 543–544.